Figure 1:
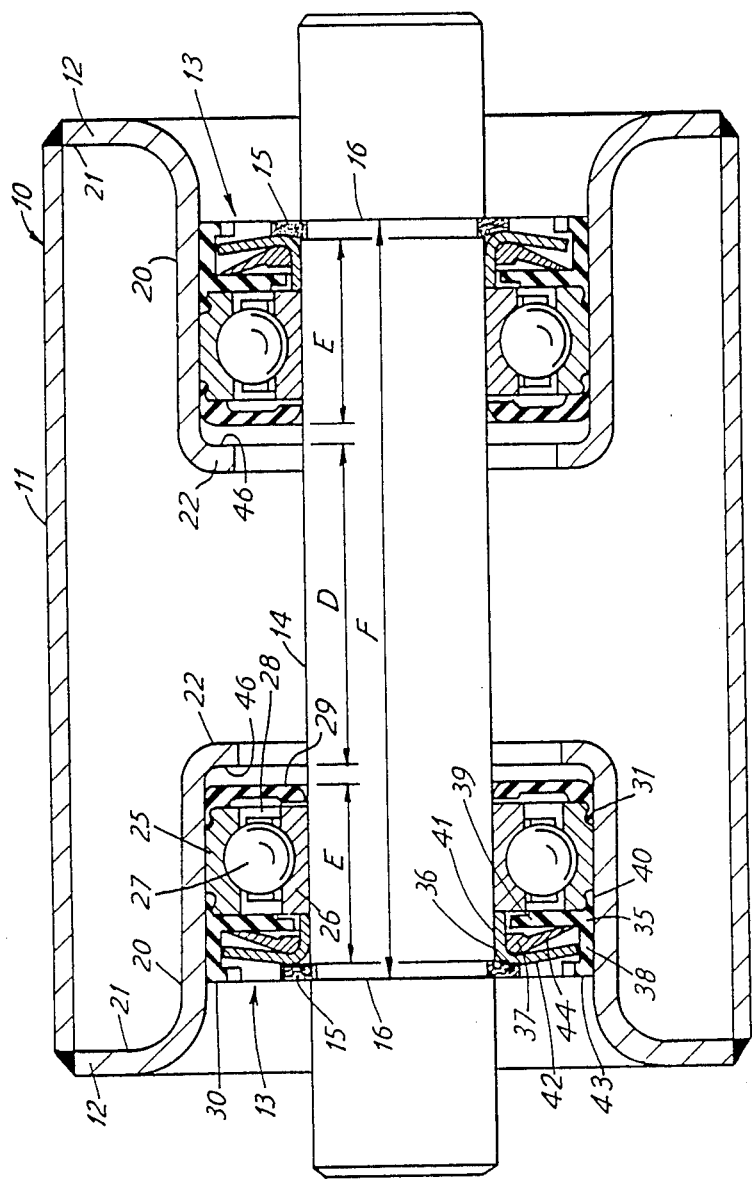

United States Patent [19]

Neal

[11] Patent Number: 4,632,576
[45] Date of Patent: Dec. 30, 1986

[54] BEARING UNITS

[75] Inventor: Hubert W. T. Neal, Luton, England

[73] Assignee: SKF (U.K.) Limited, Bedforshire, England

[21] Appl. No.: 730,812

[22] Filed: May 6, 1985

[30] Foreign Application Priority Data

May 10, 1984 [GB] United Kingdom ............... 8411972

[51] Int. Cl.⁴ ............................................. F16C 23/06
[52] U.S. Cl. ..................................... 384/537; 384/626
[58] Field of Search ............... 384/537, 903, 519, 583, 384/551, 626; 308/244, DIG. 11

[56] References Cited

U.S. PATENT DOCUMENTS

| 3,672,019 | 6/1972 | Barnbrook et al. | 29/148.4 A |
| 4,067,585 | 1/1978 | Rode | 277/200 |
| 4,364,615 | 12/1982 | Euler | 384/903 |
| 4,492,018 | 1/1985 | Rode | 308/244 |

FOREIGN PATENT DOCUMENTS

| 620566 | 1/1945 | United Kingdom . |
| 659526 | 6/1949 | United Kingdom . |
| 1058996 | 10/1964 | United Kingdom . |
| 1549001 | 7/1976 | United Kingdom . |

Primary Examiner—Lenard A. Footland
Attorney, Agent, or Firm—Browdy and Neimark

[57] ABSTRACT

A conveyor roller has end caps forming housings for ball bearing units rotatably mounting the conveyor roller on a spindle, each housing having an end wall forming an abutment for locating the bearing in the housing, and the spindle having circlips abutting the bearing units. Each bearing unit has inboard and outboard seals mounted on the outer bearing ring, and the inboard seal is formed with projections which are compressed axially with permanent deformation between the inboard seal and the end wall of the housing, so as to function as a spacer. The projections are spaced symmetrically around the axis of the bearing unit, and each projection is symmetrical about a radial plane through the center of the projection. The projections are formed integral with the seal or consist of separate V-shaped elements mounted in slots in a side face of the seal. The inboard seal is formed with a recess for each projection, the recess having a depth to accommodate the projection when in a fully collapsed condition.

10 Claims, 18 Drawing Figures

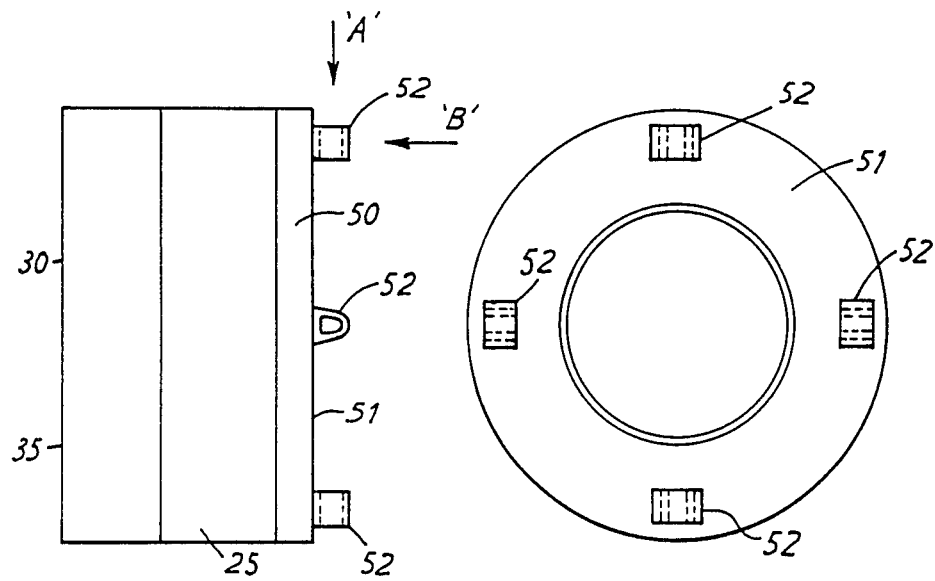
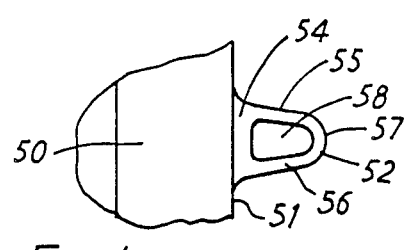
FIG.2  FIG.3
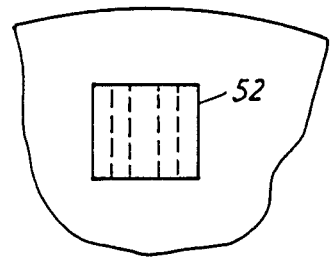
FIG.5
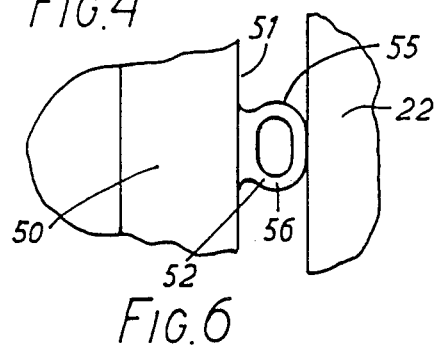
FIG.4
FIG.6

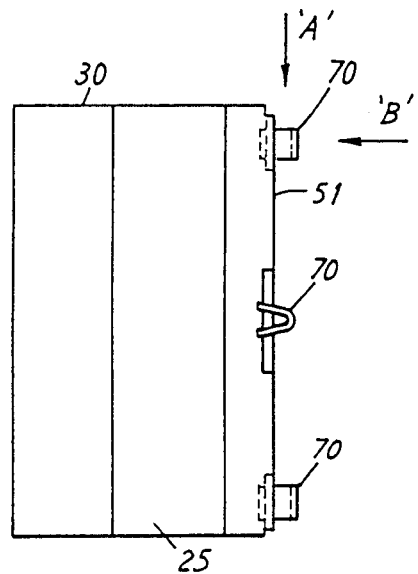
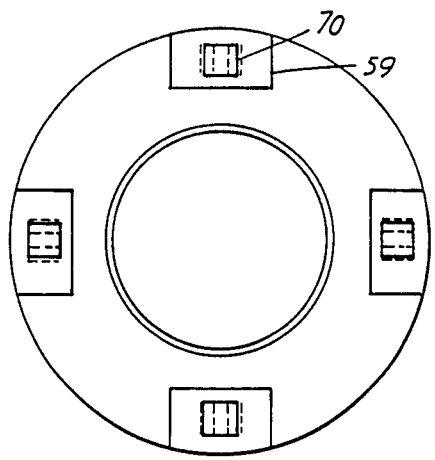
FIG.14  FIG.15
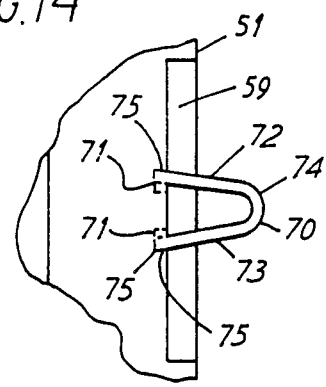
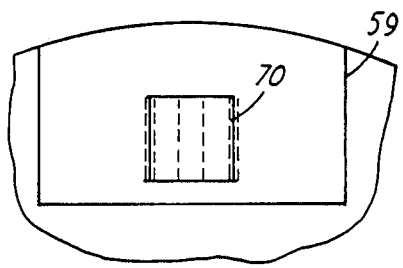
FIG.16  FIG.17
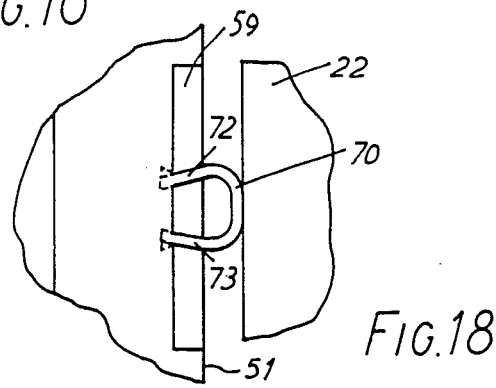
FIG.18

BEARING UNITS

This invention relates to bearing units for rotatably mounting a rotor on a support, and is concerned more particularly but not exclusively to bearing units for use in conveyor rollers.

A conveyor roller generally comprises a cylindrical tube fitted at its ends with end caps forming housings for bearings rotatably mounting the conveyor roller on a fixed spindle, each housing having an end wall forming an abutment for locating the bearing in the housing. The housings also contain inner and outer seals for the bearings. It has been the practice in the past to manufacture a conveyor roller by welding the end caps to the roller tube to relatively close tolerances, assembling the inner seals, bearings and outer seals in the end caps, passing a spindle through the bearings and seals in the assembly, and retaining the spindle in position by circlips positioned in grooves in the shaft. Where the axial play between the circlips and adjacent components was larger than could be accepted, a spacer washer of appropriate width was introduced between one of the circlips and its adjacent component. Alternatively the assembly was mounted on a spindle in which the grooves for the circlips were spaced an appropriate distance apart to avoid any axial play. Another method of avoiding axial play has been to locate one of the bearings on the spindle by two circlips positioned one on each side of the bearing.

The known methods of controlling the axial float of a roller on its spindle or shaft as described above have the disadvantage that they are expensive and time consuming. The selection of a spacer washer of an appropriate width or the selection of a spindle having appropriate spacing between the circlip grooves increases assembly time, and use of spacer washers increases material costs.

According to the invention there is provided a bearing unit adapted to be fitted in a housing having an end wall providing an abutment for the bearing unit, the bearing unit comprising an outer annular bearing member and an inner annular bearing member rotatably mounted relative to one another by rolling elements between the two members, wherein one of said annular bearing members has a side face and a plurality of projections spaced circumferentially around the bearing member and extending axially beyond said side face, the projections being adapted to collapse axially with permanent deformation of the projections when compressed between said one bearing member and said end wall of the housing upon fitting of the bearing unit into the housing, whereby the projections function as a spacer between the bearing unit and the end wall of the housing.

When the bearing unit of the invention is fitted in a housing such as an end cap of a conveyor roller, the projections collapse axially to the width necessary to take up any axial clearance between the bearing unit and the end wall of the housing. The bearing unit need then only be pressed into the housing by the distance necessary to enable a circlip to be fitted on a shaft without clearance between the circlip and the adjacent component of the bearing unit.

The invention enables the manufacture of a conveyor roller to be simplified since the axial clearance between the circlips and the adjacent components of the bearing units can be kept to a minimum, without using additional loose components or to select shafts having a particular distance between the circlip grooves. Moreover the invention provides the opportunity to use, without penalty, a wider manufacturing tolerance on the axial distance between the end cap abutments for the bearing unit.

Moreover, since the projections are formed on or attached to a component of the bearing unit, the additional cost can be small.

Figures 7, 8:
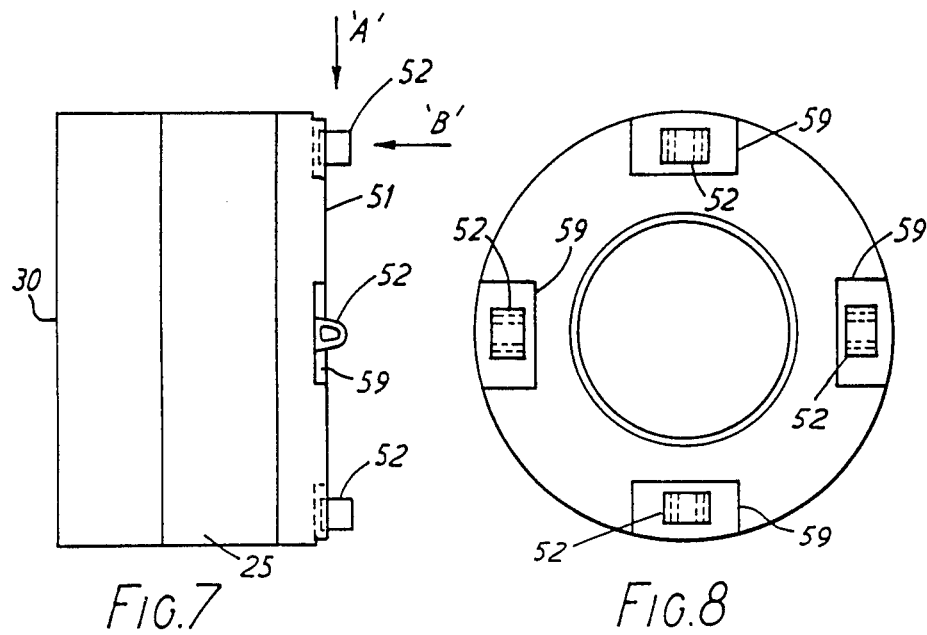
Figures 9, 10:
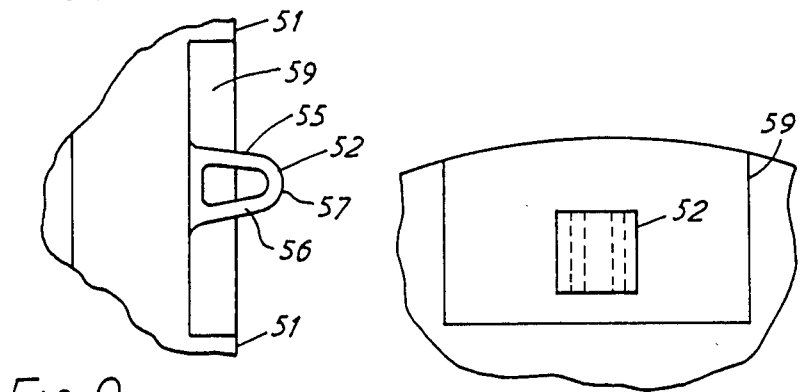
Figure 11:
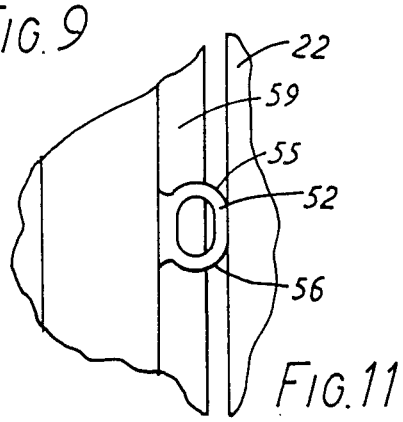
Figure 12:
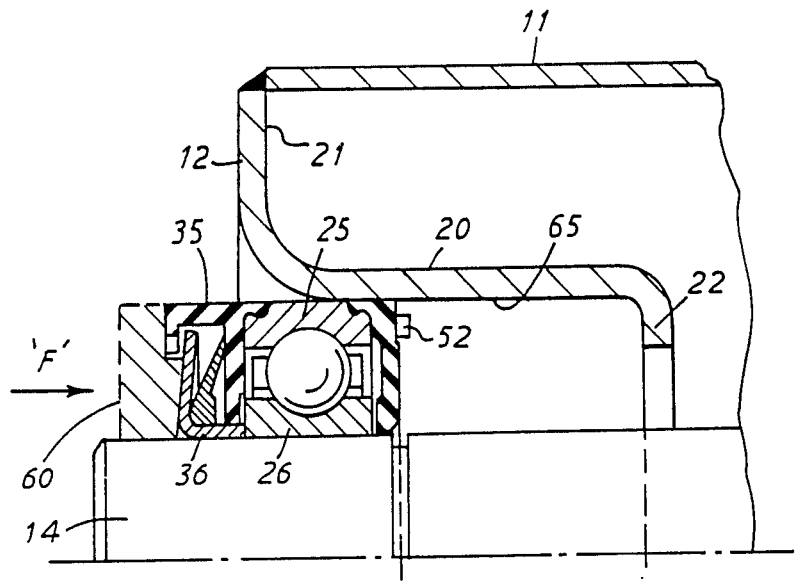
Figure 13:
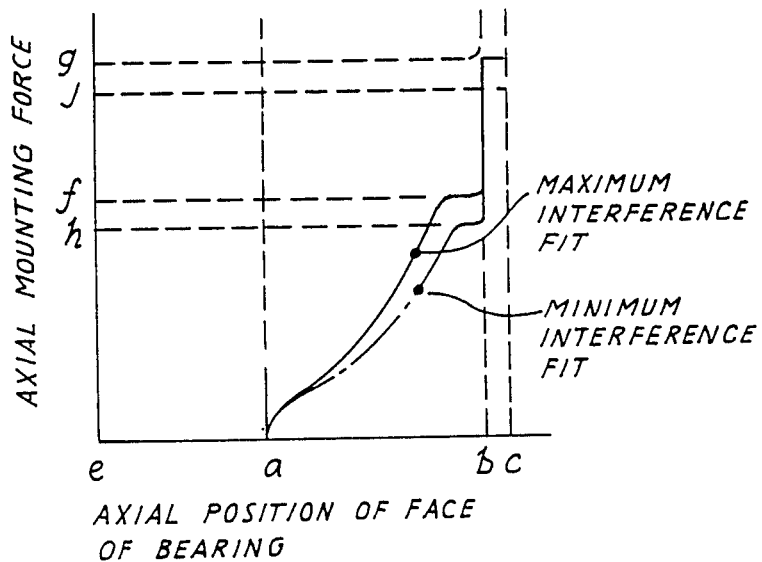

Embodiments of the invention will now be described, by way of example, with reference to the accompanying drawings, in which:

FIG. 1 is a side elevation in axial section of an idler conveyor roller having end caps filled with bearing units rotatably mounting the conveyor roller on a fixed spindle, the bearing units having inboard seals of known construction, FIG. 2 is a side elevation of a bearing unit similar to the bearing units in the conveyor roller of FIG. 1 but provided with projections on the inboard seal, the projections being adapted to act as a spacer in accordance with the invention, FIG. 3 is an end elevation of the bearing unit of FIG. 2, FIG. 4 is a view on a larger scale of part of the bearing unit of FIGS. 2 and 3 taken in the direction of arrow A in FIG. 2 and showing the projection which is adjacent the top of the bearing unit, FIG. 5 is an end elevation of the part of the bearing unit shown in FIG. 4 taken in the direction of arrow B in FIG. 2, FIG. 6 is a view similar to FIG. 4 but showing the projection after it has been partially collapsed by forcing the bearing unit against an abutment in engagement with the projection, FIGS. 7–11 are views similar to FIGS. 2–6 respectively showing a modified construction of a bearing unit according to the invention, FIG. 12 shows in axial section the fitting of the bearing unit of FIGS. 7 and 8 onto a shaft and into an end cap of a conveyor roller, FIG. 13 is a graph of the forces exerted on the bearing unit of FIGS. 7 and 8 during mounting of the bearing unit in the end cap shown in FIG. 12, and FIGS. 14–18 are views similar to FIGS. 7–11 respectively showing a bearing unit similar to that of FIGS. 7–11 but fitted with a different construction of projections.

The conveyor roller shown in FIG. 1 comprises a shell 10 consisting of a cylindrical tube 11 and two end caps 12 welded one to each end of the tube 11, two bearing units 13 mounted one in each of the end caps 12, a spindle 14 extending as a clearance fit through the bearing units, and two snap rings 15 located in grooves 16 in the spindle on the outboard side of the bearing units 13 respectively.

Each end cap 12 has a cylindrical wall 20, the outboard end of which is turned radially outwards to form an outer flange 21 and the inboard end of which is turned radially inwards to form an inner flange 22. The periphery of the outer flange 21 is welded to the associated end of the tube 11.

Each of the bearing units 13 comprises an outer bearing ring 25, an inner bearing ring 26, a plurality of balls 27 in rolling engagement with grooved tracks on the two bearing rings, a cage 28 spacing the balls around the bearing rings, an annular seal 29 mounted on the inboard side of the outer bearing ring 25, and an annular seal assembly 30 mounted on the outboard side of the outer bearing ring 25. The seal 29 is moulded in resilient plastics material and comprises an annular disc formed with axially projecting claws 31 which are engaged as a snap fit in a groove in the outer periphery of the outer bearing ring. The outer periphery of the seal 29 is substantially flush with the outer periphery of the outer bearing ring, and the seal extends radially inwards across the annular gap between the two bearing rings. The seal assembly 30 comprises an annular housing 35 moulded in resilient plastics material, an annular support member 36 made of metal, and a sealing ring 37 made of rubber or like material. The housing 35 has a cylindrical wall 38 and an annular radially extending wall 39 integral with and surrounded by the wall 38, the axially inner end of the cylindrical wall 38 having axially projecting claws 40 engaged as a snap fit in a groove in the outer periphery of the outer bearing ring, and the radial wall 39 being engaged against the outer bearing ring and forming a seal washer. The annular support member 36 is of substantially L shaped cross section and has a cylindrical wall 41 and an end wall 42. The cylindrical wall 41 extends with small clearance through the bore of the wall 39 of the housing and abuts against the inner bearing ring 26. The outer periphery of the end wall 42 is spaced with small clearance from the inner surface of the cylindrical wall 38 of the housing and overlaps lips 43 on the axially outer end of the wall 38. The sealing ring 37 is a radial interference fit on the support member at the junction between the walls 41, 42 and has an annular lip 44 which is in sealing sliding contact with the seal washer formed by the radial wall 39 of the housing.

The conveyor roller of FIG. 1 is of conventional construction, except the seal assembly 30 which is the subject of our British Patent Application No. 8333985. In the welding of the end caps onto the ends of the cylindrical tube 11, it is difficult to obtain close control over the axial dimension D between the axial outer faces 46 of the inner flanges 22 of the end caps, and it is customary to allow a large tolerance in the order of 2 mm in the dimension D. Also, tolerance must be allowed for in the axial dimension E of the bearing unit. Thus, the dimension F between the axial outer faces of the grooves 16 in the spindle must be sufficiently large to accommodate the largest permissible dimensions D and E. Hence, except in the exceptional circumstances when the dimensions D and E are the maximum permissible, there will be a clearance either between the inboard seal 29 and the inner flange 22 of the end cap, or between the seal assemblies 30 and the snap rings 15.

The conveyor roller is designed and assembled so that the outer bearing rings 25 are an interference fit on the walls 20 of the end caps, the inner bearing rings 26 are a clearance fit on the spindle 14, and the snap rings 15 abut against the outer faces of the bearing units so as to locate the conveyor roller axially on the spindle. If however the axial force applied to the roller, in operation, is higher than the interference fit retaining forces between the outer bearing rings and the end caps, the shell 11, 12 will move axially relative to the bearing units and the spindle. This is particularly undesirable if the conveyor roller is subjected to reversing axial load, since if the roller is allowed to flutter axially there will be wear between the bore of the bearing units and the spindle.

The bearing unit shown in FIGS. 2–6 comprises a ball bearing having an outer bearing ring 25 and an annular seal assembly 30 mounted on the outboard side of the bearing ring 25, the ball bearing and seal assembly being identical to the corresponding parts of the bearing units 13 in the conveyor roller of FIG. 1. The bearing unit of FIGS. 2–6 has an annular seal 50 which is similar to the annular seal 29 in the bearing units of the conveyor roller of FIG. 1 and is mounted in a similar manner on the inboard side of the bearing unit. The seal 50 is however provided on its exposed side face 51, that is the side face remote from the ball bearing, with four projections 52 which are spaced symmetrically around the seal and which extend axially away from the side face 51. The seal is moulded in resilient plastics material and the projections are moulded integral with the side face 51 of the seal. Each projection has a substantially rectangular base 54 the sides of which extend parallel to the radius through the centre of the projection as viewed in the direction of arrow B as shown in FIG. 3, two side walls 55, 56 (FIG. 4) which are integral with the base and which, in an unstressed condition as shown in FIG. 4, are inclined towards one another in the axial direction away from the side face 51, and an arched portion 57 which interconnects the ends of the side walls 55, 56, the base 54, side walls 55, 56 and the arched portion 57 co-operating to form an opening 58 which extends through the projection with the axis thereof parallel to the radius through the centre of the projection.

The projections 52 of the bearing unit are arranged so that, when the bearing unit is pressed into an end cap of a conveyor roller similar to that shown in FIG. 1, the projections engage against the inner flange 22 of the end cap and are compressed axially. As shown in FIG. 6, the axial force exerted on the projections causes the side walls 55, 56 to bow away from one another in the circumferential direction of the seal so that the projections partially collapse. The projections 52 remain in contact with the inner flange 22 of the end cap and thereby prevent axial inward movement of the bearing unit when the conveyor roller is in operation. The conveyor roller and the projections are designed so that the axial forces acting on the roller do not exceed the force necessary to cause further collapse of the projections.

FIGS. 7–11 show an improved construction of the bearing unit of FIGS. 2–6 in which each of the projections 52 are moulded integral with the bottom face of a shallow recess 59 in the side face 51 of the seal. The recesses have a depth such that their projections can collapse wholly within the recesses, and the side face 51 of the seal abuts flat against the inner flange 22 of the end cap when the bearing unit is pressed into the end cap. The projections 52 may, if desired, be made separately and attached to the bottom faces of the recesses 59 by adhesive or mechanical attachment.

FIG. 12 shows in axial section the bearing unit of FIGS. 7–11 being mounted axially onto a spindle 14 and into an end cap 12 of a conveyor roller similar to that shown in FIG. 1. The outer bearing ring 25 is an interference fit against the inside surface of the wall 20 of the end cap and the inner bearing ring 26 is a clearance fit on the spindle 14. An annular dolly 60 is used for application of the axial assembly force to the bearing unit. The radially outer part of the dolly engages against the housing 35 of the seal assembly and the radially inner part of the dolly engages against the support member 36 which in turn engages against the inner bearing ring 26. The bearing unit is forced into the end cap to a position in which the projections 52 engage against the inner flange 22 of the end cap and are compressed axially just sufficiently to enable a circlip to be fitted into the groove in the spindle 14.

FIG. 13 is a graph of the forces involved when the bearing unit of FIGS. 7–11 is pressed into an end cap of a conveyor roller, the abscissa representing the axial position of the bearing unit relative to the inner flange 22 of the end cap, and the ordinate representing the axial mounting force. Position "a" represents the position when the bearing unit just engages the seating 65 on the wall 20 of the end cap. The force required progressively increases as the bearing unit approaches position "b", the actual force at any particular position being dependent on the degree of the interference fit between the bearing unit and the seating 65. At position "b" the projections 52 engage against the inner flange 22 of the end cap. The mounting force then increases to a value within the range "j-g" to effect collapse of the projections. The collapsing force of the projections is substantially constant, so that the mounting force then remains substantially constant up to the position "c" at which the side face 51 of the bearing unit abuts the inner flange 22 of the end cap.

The holding force/fitting force "e-f" and "e-h" are fixed by considerations relating to the performance of the rolling bearing in the bearing unit. The additional holding force/mounting force "f-g" or "h-j" may be chosen to suit the application requirements. This latter force will be determined by the number of projections, the material from which the projections are made, the thickness of the projections, the radial length of the projections, the axial length of the projections, and the shape of the projections. The shape of the projections must be selected so that they remain substantially stable during collapse. The recesses 59 in the side face 51 enable a minimum depth of end cap to be used as no further axial allowance need be made for the projections. With the bearing unit of FIGS. 2–6 in which there are no recesses for reception of the collapsed projections, the side face 51 cannot of course contact the inner flange 22 of the end cap. However, the projections collapse into solid spacer elements when the side face 51 is as near to the inner flange 22 as possible.

FIGS. 14–18 show a modification of the bearing unit of FIGS. 7–11 in which projections 70 are mounted in radial slots 71 in the bottom face of shallow recesses 59 in the side face 51 of the seal. Each of the projections 70 consists of a V-shaped element having two legs 72, 73 interconnected by an arcuate portion 74, the legs and arcuate portion having a shape similar to that of the side walls 55, 56 and the arcuate portion 57 respectively of the projections 52 in the bearing unit of FIGS. 7–11. Each of the legs 72, 73 is mounted in a separate slot 71 and the radial face 75 of each slot which is adjacent the outer face of its associated leg is angled to match the angle of inclination of the leg relative to the side face 51. The projections 70 are made of a material having a degree of spring characteristic suitable only for retention of the projections in the slots 71. When the projections 70 are in an unstressed condition prior to being mounted on the bearing unit, the distance between the splayed ends of the legs 72, 73 of each projection is slightly greater than the distance between the side faces 75 of its two slots 71. Each projection is mounted in its slots 71 by manually pinching the splayed ends of the legs 72, 73 to a distance permitting insertion of the splayed ends of the legs in the slots. Release of the pinching action causes the legs to splay further apart and engage the angled faces 75 of the slots. The angled faces on the slots reduce the risk of inadvertent displacement of the projections during mounting of the bearing unit in an end cap, since the projections can only be released from the slots by again pinching the splayed ends of the legs 72, 73.

As in the bearing units of FIGS. 2–6 and FIGS. 7–11, the projections 70 are arranged so that, when the bearing unit is pressed in an end cap of a conveyor roller similar to that shown in FIG. 1, the projections engage against the inner flange 22 of the end cap and are compressed axially. As shown in FIG. 18, the axial force exerted on the projections causes the legs 72, 73 to bow away from one another in the circumferential direction of the bearing unit so that the projections partially collapse.

I claim:

1. A bearing unit adapted to be fitted in a housing having an end wall providing an abutment for the bearing unit, the bearing unit comprising an outer annular bearing member and an inner annular bearing member, the two bearing members being rotatably mounted relative to one another by rolling elements between the two members, and one of said bearing members having a side face and a plurality of projections spaced symmetrically around the bearing member and extending axially beyond said side face so that the projections engage the end wall of the housing upon fitting of the bearing unit into the housing, wherein each projection comprises an arched portion adapted to collapse progressively with permanent deformation of the arched portion when the projection is compressed between said one bearing member and the end wall of the housing during the fitting of the bearing unit into the housing, whereby the projections function as a spacer between the bearing unit and the end wall of the housing during operation of the bearing unit, the width of which spacer being substantially constant and determined by the axial force exerted on the bearing unit during the fitting of the bearing unit into the housing.

2. A bearing unit as claimed in claim 1, wherein said one bearing member comprises a bearing ring and a seal fitted to the bearing ring on one side thereof, the seal being formed of resilient plastics material and the projections being formed integral with the seal on the side thereof remote from the bearing ring.

3. A bearing unit as claimed in claim 2, wherein each projection is symmetrical about a radial plane through the centre of the projection and comprises two legs arranged one at each side of the radial plane and inclined towards one another in the direction away from said seal when the projection is in an unstressed condition, and said arched portion interconnects the ends of the legs.

4. A bearing unit as claimed in claim 1, wherein said side face of the bearing member is formed with a recess for each projection, the recess having a bottom face spaced axially inwards from the remainder of said side face, and the projection is mounted on the bottom face of the recess, the recess having a depth to accommodate the projection when the arched portion thereof is in a fully collapsed condition.

5. A bearing unit as claimed in claim 4, wherein the bottom face of the recess is formed with two slots, and the projection comprises a V-shaped element having two legs mounted one in each of said slots, the distance between the splayed ends of the legs of the V-shaped element in an unstressed condition prior to the fitting of the V-shaped element in the slots being greater than the distance between the slots, and the V-shaped element being made of a material having a degree of spring characteristic suitable only for retention of the legs of the V-shaped element in said slots.

6. A bearing unit as claimed in claim 5, wherein each of said slots has a side face in contact with the leg of the V-shaped element engaged in the slot, said side face of the slot being inclined relative to the bottom face of the recess at substantially the same angle as that of the associated leg of the V-shaped element relative to said bottom face.

7. A bearing unit rotatably mounting a conveyor roller on a fixed spindle, the conveyor roller having an end cap defining a housing for the bearing unit, the housing having an end wall providing an abutment for the bearing unit, and the spindle having a groove fitted with a circlip abutting the bearing unit, the said bearing unit comprising an outer annular bearing member and an inner annular bearing member, the two bearing members being rotatably mounted relative to one another by rolling elements between the two members, wherein the outer bearing member has a side face adjacent said end wall of the housing and a plurality of projections spaced symmetrically around the outer bearing member and compressed between said side face and the end wall of the housing, each of said projections comprising an arched portion which has been collapsed with permanent deformation of the arched portion due to axial thrust exerted on the outer bearing member during the fitting of the bearing unit into the housing, whereby the projections function as a spacer between the outer bearing member and the end wall of the housing during operation of the bearing unit, the width of which spacer being substantially constant and determined by the magnitude of said axial thrust.

8. A bearing unit as claimed in claim 7, wherein the outer bearing member comprises an outer bearing ring and a seal fitted to the outer bearing ring on the side thereof adjacent said end wall of the housing, the seal being formed of resilient plastics material and the projections being formed integral with the seal on the side thereof remote from the outer bearing ring.

9. A bearing unit as claimed in claim 8, wherein the inner bearing member comprises an inner bearing ring and a seal fitted to the inner bearing ring on the side thereof remote from said end wall of the housing, the circlip on the spindle abutting the seal on the inner bearing ring.

10. A bearing unit as claimed in claim 7, wherein said side face of the outer bearing member is formed with a recess for each projection, the recess at least partially accommodating the collapsed arched portion of the projection.

* * * * *